United States Patent
Kawamoto et al.

(10) Patent No.: US 8,513,568 B2
(45) Date of Patent: Aug. 20, 2013

(54) CONSUMABLE ELECTRODE ARC WELDING METHOD AND CONSUMABLE ELECTRODE ARC WELDING DEVICE

(75) Inventors: Atsuhiro Kawamoto, Hyogo (JP); Yasushi Mukai, Osaka (JP); Junji Fujiwara, Osaka (JP); Toshiyuki Mishima, Osaka (JP); Masaru Kowa, Osaka (JP)

(73) Assignee: Panasonic Corporation, Osaka (JP)

( * ) Notice: Subject to any disclaimer, the term of this patent is extended or adjusted under 35 U.S.C. 154(b) by 18 days.

(21) Appl. No.: 13/000,779

(22) PCT Filed: Jun. 16, 2010

(86) PCT No.: PCT/JP2010/003991
§ 371 (c)(1),
(2), (4) Date: Dec. 22, 2010

(87) PCT Pub. No.: WO2010/146844
PCT Pub. Date: Dec. 23, 2010

(65) Prior Publication Data
US 2012/0074114 A1    Mar. 29, 2012

(30) Foreign Application Priority Data
Jun. 19, 2009   (JP) .................................. 2009-146217

(51) Int. Cl.
*B23K 9/10*   (2006.01)
*B23K 9/12*   (2006.01)
*B23K 33/00*  (2006.01)

(52) U.S. Cl.
USPC .............. 219/130.21; 219/125.1; 219/130.01; 219/130.33; 219/137 R; 219/137.7; 219/137.71

(58) Field of Classification Search
USPC ............... 219/125.1, 130.01, 130.21, 130.33, 219/137 R, 137.7, 137.71
See application file for complete search history.

(56) References Cited

U.S. PATENT DOCUMENTS
3,575,573 A  *  4/1971  McCollister et al. ...... 219/130.1
3,581,053 A  *  5/1971  Manz ........................ 219/137 R
(Continued)

FOREIGN PATENT DOCUMENTS
JP    48-11463    4/1973
JP    62-006775   1/1987
(Continued)

OTHER PUBLICATIONS
International Search Report for Application No. PCT/JP2010/003991 (in Japanese), Sep. 7, 2010, Panasonic Corporation.

*Primary Examiner* — Joseph M Pelham
*Assistant Examiner* — Gyounghyun Bae
(74) *Attorney, Agent, or Firm* — RatnerPrestia (57) ABSTRACT

If a short circuit does not occur during deceleration of a wire feed speed in forward feed of a welding wire before the wire feed speed reaches a predetermined wire feed speed, a cyclic change is stopped and the wire feed speed is constantly controlled at the first feed speed. If a short circuit occurs during forward feed at the first feed speed, deceleration from the first feed speed starts, and the cyclic change is resumed for welding. This achieves uniform weld bead without increasing spatters even if any external disturbance such as change of distance between a tip and base material occurs.

23 Claims, 6 Drawing Sheets

(56) References Cited

U.S. PATENT DOCUMENTS

| | | | |
|---|---|---|---|
| 3,731,049 A * | 5/1973 | Kiyohara et al. | 219/137.71 |
| 3,956,610 A * | 5/1976 | Kanbe et al. | 219/137 PS |
| 4,300,036 A * | 11/1981 | Johansson | 219/130.33 |
| 4,518,844 A * | 5/1985 | Needham | 219/137 PS |
| 4,647,754 A * | 3/1987 | Hirasawa | 219/130.21 |
| 6,531,684 B2 * | 3/2003 | Rice et al. | 219/130.21 |
| 6,627,850 B1 * | 9/2003 | Koga et al. | 219/137.71 |
| 6,800,832 B2 * | 10/2004 | Hutchison et al. | 219/130.21 |
| 7,323,658 B2 * | 1/2008 | Rice et al. | 219/130.1 |
| 8,080,763 B2 * | 12/2011 | Fujiwara et al. | 219/130.51 |
| 2006/0138115 A1 | 6/2006 | Norrish et al. | |

FOREIGN PATENT DOCUMENTS

| | | |
|---|---|---|
| JP | 2004-298924 A | 10/2004 |
| JP | 2005-528223 A | 9/2005 |
| WO | WO 03/101658 A1 | 12/2003 |

\* cited by examiner

CONSUMABLE ELECTRODE ARC WELDING METHOD AND CONSUMABLE ELECTRODE ARC WELDING DEVICE

TECHNICAL FIELD

The present invention relates to consumable electrode arc welding methods and consumable electrode arc welding devices that feed a welding wire, which is a consumable electrode, and welds the wire onto a workpiece to be welded by alternately generating a short circuit state and an arc condition between the consumable electrode and the workpiece.

BACKGROUND ART

Demand for faster welding speed and less spatter, so as to increase productivity, have been increasing in the welding industry. Faster welding speed increases production quantity per time, and thus welding productivity increases. Less spattering reduces a post-treatment process of removing spatter attached to a base material, and thus welding productivity also increases.

Figure 5:
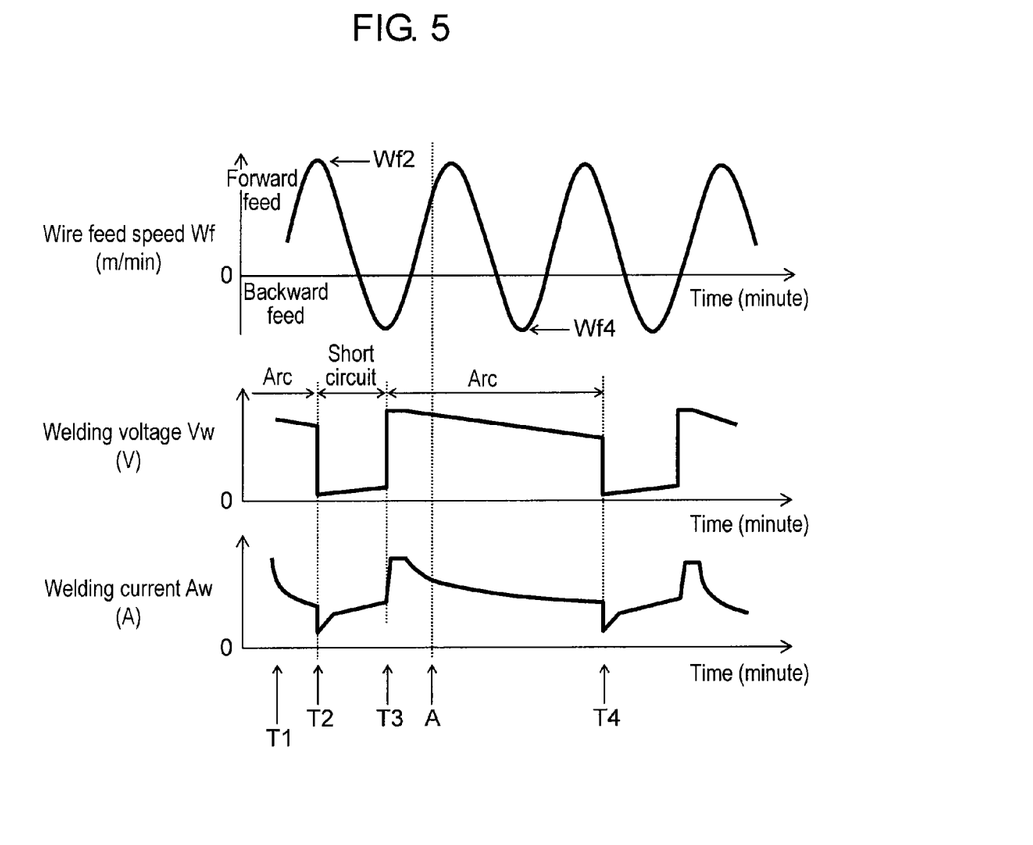
FIG. 5 illustrates waveforms of a wire feed speed, welding voltage, and welding current in conventional arc welding.

FIG. 5 shows waveforms of wire feed speed Wf, welding voltage Vw, and welding current Aw in conventional arc welding. First, conventional arc welding is described with reference to FIG. 5. In a known welding process, the wire feed speed is changed cyclically to forcibly cause a short circuit, and arc is regenerated by forcibly opening the short circuit (for example, refer to Patent Literature 1). In this prior art, the short circuit is opened without depending on electromagnetic pinch force of welding current, and thus spatter can be reduced.

In FIG. 5, time T1 is one time point in an arc period while arc is generated between a wire end and a base material. Wire feed speed Wf accelerates toward maximum speed Wf2.

At time T2, the wire and the base material are short-circuited, and a short circuit period starts. Wire feed speed Wf is controlled cyclically, regardless of an arc condition, according to a predetermined command value. Accordingly, a short-circuit timing may be a time point other than when wire feed speed Wf is at maximum speed Wf2. The short-circuit timing is a time point when the wire feed speed is around the maximum speed Wf2. It may be a time point during forward acceleration or forward deceleration. The timing differs with every short circuit.

Time T3, at which the short circuit is opened and arc is regenerated, comes during backward feed. A short-circuit opening timing may be a time point other than when wire feed speed Wf is at minimum speed (Wf4). The short-circuit opening timing is a time point when the wire feed speed is around minimum speed Wf4. It may be a time point during backward deceleration or backward acceleration. The timing differs with every short-circuit opening. At any timing, however, the short circuit is opened during backward feed. Accordingly, the short circuit is forcibly opened without depending on electromagnetic pinch force of welding current, and thus spatter can be reduced.

Wire feed speed Wf includes one forward feed and one backward feed in its one cycle. In one cycle, one short circuit and one opening of short circuit take place. In response to this cyclic operation of wire feed speed Wf, welding involving arc phenomenon is controlled. A predetermined cycle of wire feed speed Wf is a short-circuit generating frequency or the number of short circuits per second. This stabilizes welding while reducing spatter.

With respect to a welding device in which the wire is controlled to feed forward and backward, there is disclosed a welding control method of controlling the wire feed speed in response to welding phenomenon. (For example, refer to Patent Literature 2.) The wire feed speed is accelerated during the arc period, and is then controlled at a predetermined constant speed. When a short circuit is detected, the wire feed speed is decelerated, and then the wire is drawn up at a predetermined constant speed different from the above constant speed to open the short circuit and regenerate arc. Welding takes place through repetition of these operations. Also in this method, the short circuit is opened during backward feed. Accordingly, the short circuit is forcibly opened without depending on the electromagnetic pinch force of welding current, and thus spatter can be reduced.

In the aforementioned conventional welding control method disclosed in Patent Literature 1, stable welding with less spatter is achievable if there is no disturbance such as change of distance between the tip and base material. However, for example, if the position of base material deviates and the distance from the tip becomes longer during welding, the distance between the tip and base material becomes suddenly longer at timing A shown in FIG. 5. When this extended distance becomes greater than a distance advanced in the forward feed period of the wire feed speed, a short circuit does not occur. Then, the process goes on to backward feed in this state, which means the state without short circuit continues. Accordingly, generation of short circuit is delayed until the next forward feed period (e.g., until time T4). During this period without generation of short circuit, a droplet is formed at the wire end, and this droplet grows. A large droplet is released from the wire end by the movement of wire due to the change of distance between the tip and base material. This may become spatter and may splatter out of a weld pool. Even if the droplet does not splatter outside, a large droplet extends the short circuit state. The short circuit may not be sufficiently opened in the next short circuit, and thus the droplet may adhere to the base material. As a result, the state of unstable arc has occurred.

Figure 6:
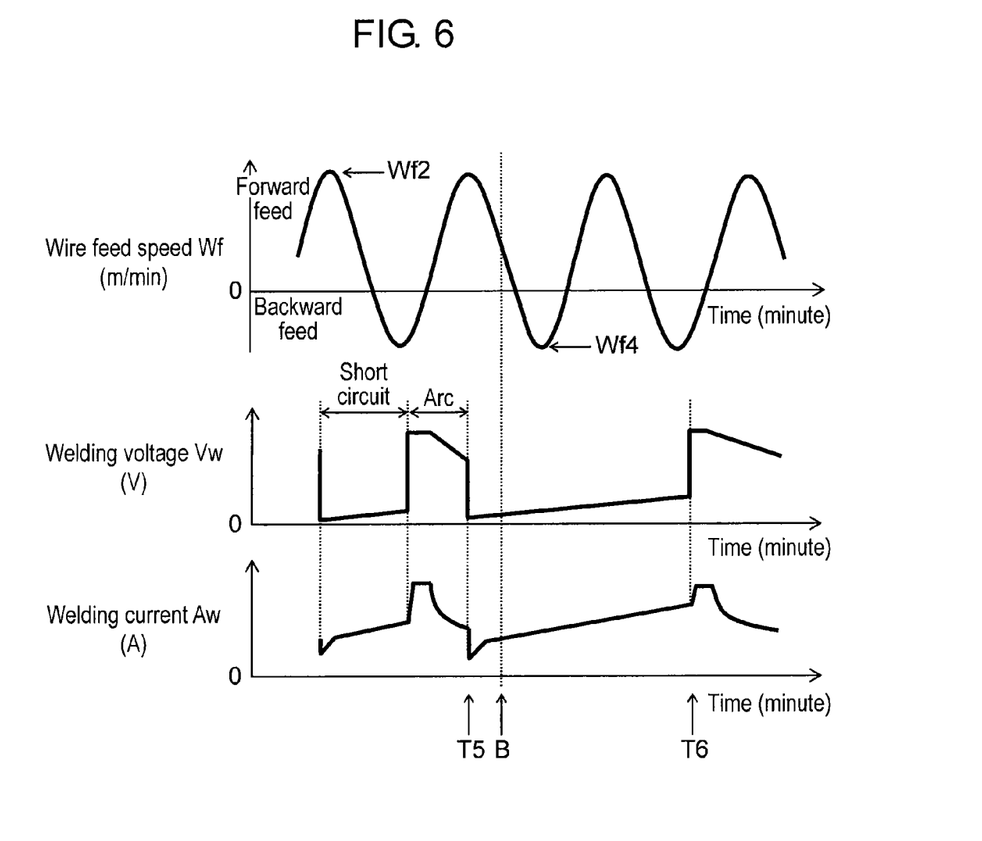
FIG. 6 illustrates waveforms of a wire feed speed, welding voltage, and welding current in conventional arc welding.

As shown in FIG. 6, let's say a short circuit occurs at time T5, and distance between the tip and base material becomes suddenly shorter at timing B. If this shortened distance becomes greater than a length of wire drawn up at the wire feed speed in the backward feed period, the short circuit continues without being opened until the next backward feed period (e.g., until time T6). In this case, temperature of a welded portion decreases, and weld bead narrows and thins due to extended short circuit time. This may result in uneven bead width. In addition, welding may become not feasible due to deposited wire end and base material. Alternatively, if a high current of about 400 A to 500 A is continuously applied, a short-circuiting wire portion may splatter by generating a large amount of spatter by means of electromagnetic pinch force, and arc may be regenerated. In any case, spatter generation increases, and the bead width becomes uneven.

In the welding device, in which the wire is controlled to feed forward and backward, disclosed in Patent Literature 2, the cycle of forward feed and backward feed of the wire feed speed is controlled in response to the arc phenomenon in the conventional welding control method for controlling the wire feed speed in line with the welding phenomenon. Accordingly, if the short circuit time becomes longer, the backward feed becomes longer. If the arc time becomes longer, the forward feed becomes longer. Opposite states are also controlled in the same way. The average feed speed of wire feed speed, short circuit cycle, and the number of short circuits become unstable and change if the arc phenomenon changes. Welding results thus cannot be stabilized.

If there is almost no change in the distance between the tip and base material, there is no problem. However, external disturbance such as change of distance between the tip and base material typically due to deviation in placement of base material or variations in accuracy of components, such as pressed components, frequently occur at actual production sites. Accordingly, the average feed speed of wire feed speed and short circuit cycle greatly change and fluctuate, resulting in difficulty to stabilize welding results.

Patent Literature 1: Japanese Patent Unexamined Publication No. S62-6775

Patent Literature 2: Japanese Patent Examined Publication No. S48-11463

SUMMARY OF THE INVENTION

A consumable electrode arc welding method of the present invention is a consumable electrode arc welding method in which welding takes place at a wire feed speed that cyclically changes between forward feed for feeding toward a workpiece and backward feed for feeding in a direction opposite to the forward feed in a predetermined cycle and amplitude. If a short circuit does not occur during deceleration of wire feed speed in the forward feed of the welding wire before the wire feed speed reaches a predetermined wire feed speed, before a predetermined time passes from arc generation, or before a feed cycle of welding wire reaches a predetermined angle when a predetermined feed cycle of welding wire is expressed by an angle; the cyclic change of wire feed speed is stopped and the speed is constantly controlled at the first feed speed. If a short circuit occurs during forward feed at the first feed speed, deceleration from the first feed speed starts, and the cyclic change is resumed for welding.

The consumable electrode arc welding method of the present invention is a consumable electrode arc welding method in which welding takes place at a wire feed speed that cyclically changes between forward feed for feeding toward a workpiece and backward feed for feeding in a direction opposite to the forward feed in a predetermined cycle and amplitude. If a short circuit is not opened during acceleration of wire feed speed in backward feed of the welding wire before the wire feed speed reaches a predetermined wire feed speed, before a predetermined time passes from short circuit generation, or before a feed cycle of welding wire reaches a predetermined angle when a predetermined feed cycle of welding wire is expressed by an angle; the cyclic change of wire feed speed is stopped and the speed is constantly controlled at the second feed speed. If a short circuit is opened during backward feed at the second feed speed, acceleration from the second feed speed starts, and the cyclic change is resumed for welding.

A consumable electrode arc welding device of the present invention is an arc welding device in which welding takes place by repetition of the arc state and short circuit state between the welding wire and workpiece. The arc welding device includes a switching element for controlling welding output; a welding voltage detector for detecting welding voltage; a welding condition setting unit for setting current; a short circuit/arc detector for detecting the short circuit state and arc state based on an output of the welding voltage detector; a memory for storing the set current, average feed speed of wire feed speed, frequency of wire feed speed, and amplitude of wire feed speed in a linked manner; a wire feed speed determinator for determining the average feed speed of wire feed speed, frequency of wire feed speed, and amplitude of wire feed speed from the memory based on the set current set by the welding condition setting unit; and a wire feed speed controller for controlling cyclic change of forward feed and backward feed of the wire feed speed by receiving the output of the short circuit/arc detector and the output of the wire feed speed determinator. The wire feed speed controller stops a cyclic change of the wire feed speed and applies constant control at the first feed speed if a short circuit does not occur during deceleration of wire feed speed in forward feed of the welding wire before the wire feed speed reaches a predetermined wire feed speed, before a predetermined time passes from arc generation, or before a feed cycle of welding wire reaches a predetermined angle when a predetermined feed cycle of welding wire is expressed by an angle. If a short circuit occurs during forward feed at the first feed speed, deceleration from the first feed speed starts, and the cyclic change of wire feed speed is resumed for welding.

The consumable electrode arc welding device of the present invention is an arc welding device in which welding takes place by repetition of the arc state and short circuit state between the welding wire and workpiece. The arc welding device includes a switching element for controlling welding output; a welding voltage detector for detecting welding voltage; a welding condition setting unit for setting current; a short circuit/arc detector for detecting the short circuit state and arc state based on an output of the welding voltage detector; a memory for storing the set current, average feed speed of wire feed speed, frequency of wire feed speed, and amplitude of wire feed speed in a linked manner; a wire feed speed determinator for determining the average feed speed of wire feed speed, frequency of wire feed speed, and amplitude of wire feed speed from the memory based on the set current set by the welding condition setting unit; and a wire feed speed controller for controlling cyclic change of forward feed and backward feed of the wire feed speed in a cycle by receiving the output of the short circuit/arc detector and the output of the wire feed speed determinator. The wire feed speed controller stops a cyclic change of the wire feed speed and applies constant control at the second feed speed if a short circuit is not opened during acceleration of wire feed speed in backward feed of the welding wire before the wire feed speed reaches a predetermined wire feed speed, before a predetermined time passes from arc generation, or before a feed cycle of welding wire reaches a predetermined angle when a predetermined feed cycle of welding wire is expressed by an angle. If a short circuit is opened during backward feed at the second feed speed, acceleration from the second feed speed starts, and the cyclic change of wire feed speed is resumed for welding.

With the above structure, spatter can be reduced and uniform bead can be achieved by controlling the wire feed speed, even if any external disturbance, such as change of distance between the tip and base material, occurs during arc generation. Accordingly, stability of arc can be enhanced.

DETAILED DESCRIPTION OF PREFERRED EMBODIMENTS

Exemplary embodiments of the present invention are described below with reference to FIGS. 1 to 4.

First Exemplary Embodiment

Figure 1:
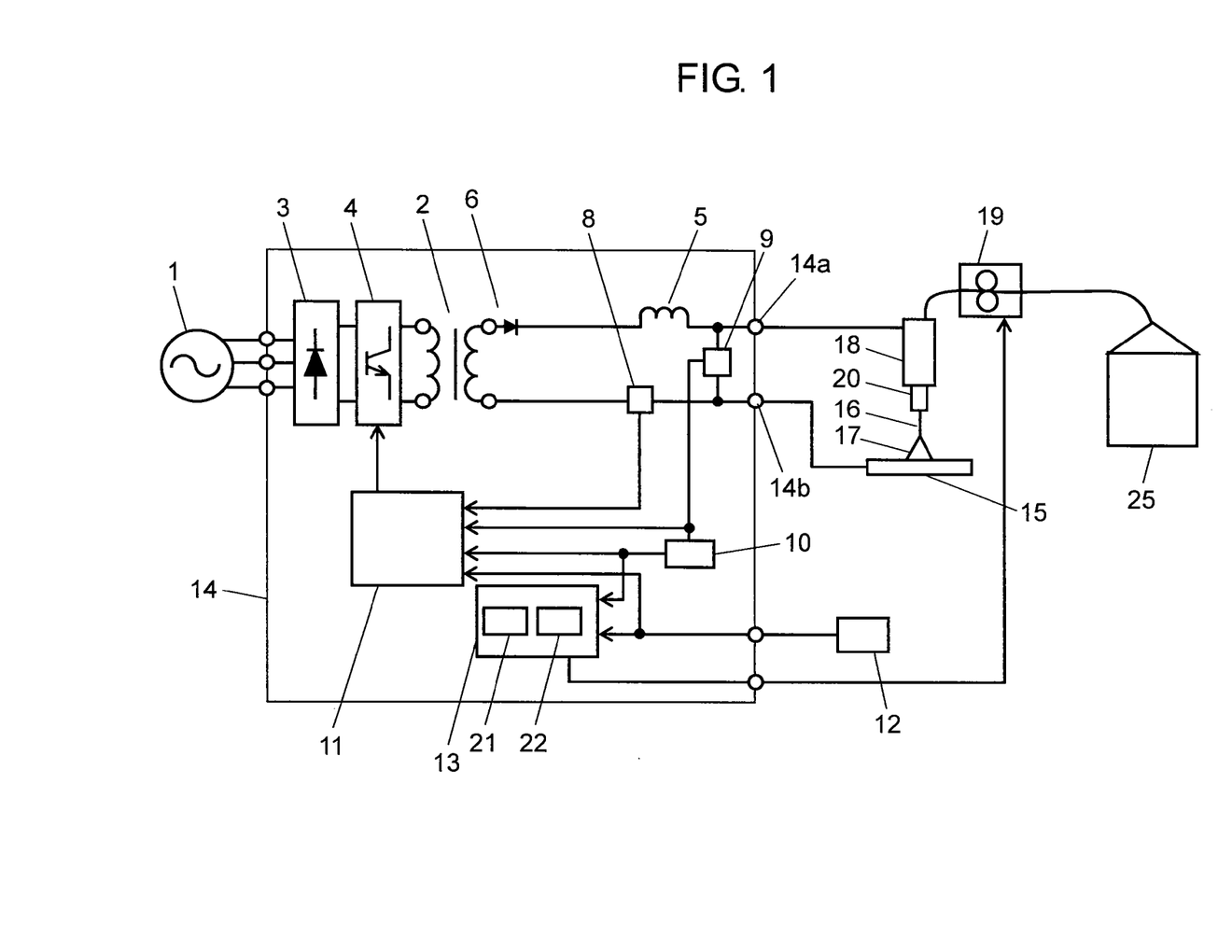
FIG. 1 is a schematic diagram of an arc welding device in accordance with first to third exemplary embodiments of the present invention.
Figure 2:
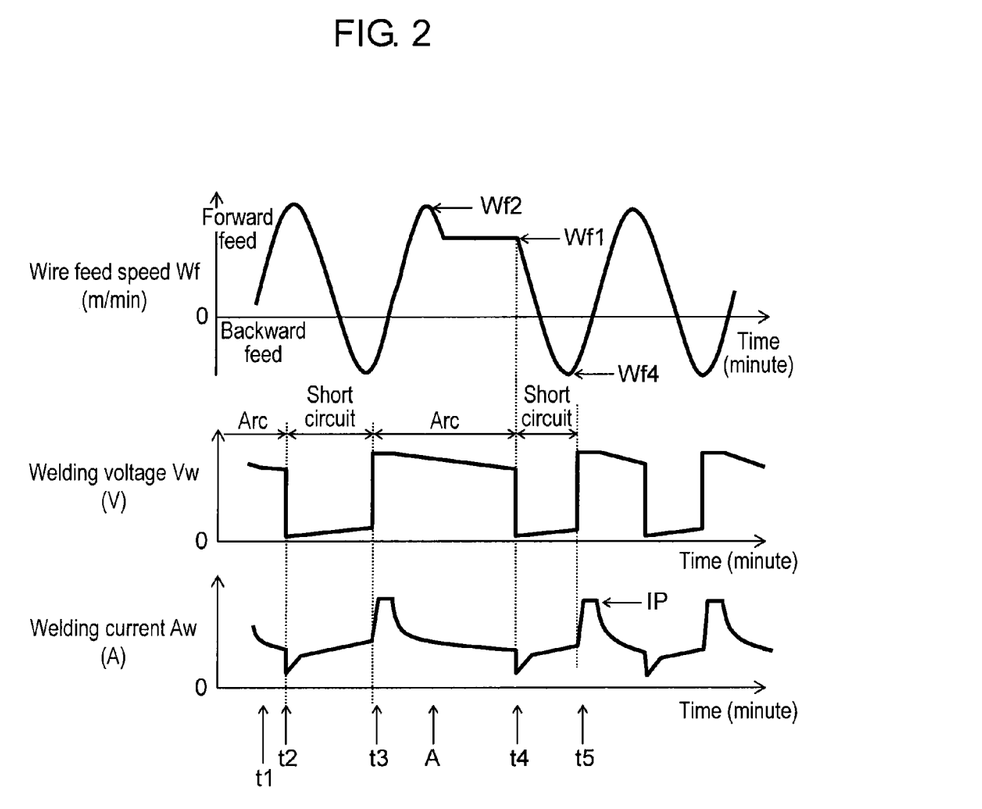
FIG. 2 illustrates waveforms of a wire feed speed, welding voltage, and welding current in accordance with the first exemplary embodiment of the present invention.

FIG. 1 is a schematic diagram of an arc welding device in this exemplary embodiment. FIG. 2 shows waveforms of a wire feed speed, welding voltage, and welding current when welding takes place adopting a consumable electrode arc welding control method in this exemplary embodiment.

In FIG. 1, input AC voltage from input power supply 1 is applied to welding power supply 14, and is rectified by primary rectifying element 3. Switching element 4 switches and controls an output of primary rectifying element 3 to an output appropriate for welding, and main transformer 2 converts the input power supply to an output appropriate for welding. Secondary rectifying element 6 rectifies one of secondary outputs insulated from the primary side in main transformer 2, and reactor 5 smoothes it to a current appropriate for welding. The current smoothed by reactor 5 is applied to torch 18 via one welding power output terminal 14a. The other secondary output of main transformer 2 is connected to base material 15 via welding current detector 8 that detects welding current and also via other welding power output terminal 14b.

Welding voltage detector 9 for detecting welding voltage is connected between welding power output terminals 14a and 14b. Wire 16 is fed from wire storage 25 to tip 20 attached to torch 18 by wire feeder 19 controlled by wire feed speed controller 13 that controls the wire feed speed. Wire 16 is used as a consumable electrode. Arc 17 is generated from an end of wire 16 to base material 15 by the welding power supply output. Short circuit/arc detector 10 determines whether a welding state is a short circuit state in which wire 16 and base material 15 are making contact, or an arc state in which a short circuit is opened and arc is generated, based on a welding voltage detection signal from welding voltage detector 9 connected to short circuit/arc detector 10. This determination is input to output controller 11 and wire feed speed controller 13.

Welding condition setting unit 12 outputs welding conditions (set welding current and set welding voltage) set by an operator to output controller 11 that controls the welding output and wire feed speed controller 13. Detection signals of welding current detector 8 and welding voltage detector 9 are input to output controller 11. Memory 21 and wire feed speed determinator 22 in wire feed speed controller 13 are described later.

FIG. 2 shows waveforms illustrating changes by time of welding voltage Vw that is welding output voltage and welding current Aw that is welding output current. In FIG. 2, when wire feed speed Wf is positive, it indicates that the wire is fed forward to base material 15. When wire feed speed Wf is negative, wire 16 is fed away from base material 15. In other words, it means wire 16 is drawn up in backward feed.

Time t1 shown in FIG. 2 is within the arc period where arc is generated. Outputs of welding voltage Vw and welding current Aw are controlled to form an appropriate droplet in order to smoothly transfer the droplet at the wire end in a coming short circuit period. Wire feed speed Wf changes cyclically according to a predetermined command value (amplitude, frequency, and average feed speed) regardless of the arc condition (short circuit period or arc period). At time t1, wire 16 is fed forward in an accelerated manner. In FIG. 2, acceleration is a direction that the wire feed speed changes from the peak of backward feed to the peak of forward feed. Deceleration is a direction that the wire feed speed changes from the peak of forward feed to the peak of backward feed. The peak of forward feed in the wire feed speed is maximum speed Wf2, and the peak of backward feed in the wire feed speed is minimum speed Wf4 in the description.

In the short circuit period from time t2 to t3, welding current Aw reduces from time t2, which is an initial point of short circuit, by controlling the current, so as to ensure generation of short circuit. Then, welding current Aw is increased in a predetermined slope. On the other hand, the wire is fed in a predetermined cycle of wire feed speed Wf, and wire feed speed Wf changes from the acceleration period to deceleration period regardless of the arc condition. If this cycle of wire feed speed Wf is between 30 to 100 Hz, there is no problem. Wire feed speed Wf decelerates and transfers from forward feed to backward feed in the short circuit period from time t2 to time t3. Then, at time t3, when backward feed starts, the short circuit is forcibly opened, and arc is regenerated.

In the output control during the arc period, starting from time t3, there is a higher tendency that higher peak current IP of welding current Aw penetrates into the weld pool deeper due to higher arc convergence, typically in $CO_2$ welding. In the worst case, the base material may melt off. On the other hand, if peak current IP is too low, a faint short circuit may occur. Accordingly, peak current IP needs to be set to minimum necessary welding current Aw in order to avoid generation of faint short circuit and also prevent penetration of weld pool. An appropriate value for this peak current IP is obtained typically through experiments depending on a workpiece to be welded.

During the arc period on and after time t3, a short circuit occurs in the forward feed of wire feed speed Wf if there is no disturbance and the distance between the tip and base material is constant. However, if any disturbance, such as longer distance between the tip and base material due to a deviated placement position of base material away from the tip end, occurs at time A, the arc period continues without occurrence of short circuit. Therefore, in this exemplary embodiment, the welding wire is fed cyclically according to the predetermined command value for wire feed speed Wf, and the speed accelerates up to maximum speed Wf2 during forward feed. Then, deceleration starts during forward feed. If the short circuit does not occur even if the speed is reduced to first feed speed Wf1, which is the predetermined wire feed speed, deceleration is stopped and switched to the control of feeding the welding wire at a constant value of first feed speed Wf1. This first feed speed Wf1 is wire feed speed Wf in forward feed for feeding welding wire 16 toward base material 15. Accordingly, a short circuit will certainly occur as time passes. Accordingly, backward feed does not start without a short circuit, which was a disadvantage of the prior art. A droplet at the wire end will not grow and thus spatter will not increase.

A short circuit can be generated earlier by setting this first feed speed Wf to the average feed speed set corresponding to each set welding current or faster than the average. To cause short circuit at earlier timing, higher first feed speed Wf1 is better. However, first feed speed Wf1 is preferably not as high as maximum speed Wf2. This is because if the distance between the tip and base material is constant when no disturbance occurs, a short circuit is generated at timing when wire feed speed Wf is around maximum speed Wf2 (within about ±⅛ cycle). Therefore, a short circuit may occur after deceleration starts from maximum speed Wf2.

If the distance between tip and base material is constant, there is almost no influence on opening of short circuit even if the timing of short circuit deviates around maximum speed Wf2 for about ±⅛ cycle. Therefore, the welding wire can be just cyclically fed at wire feed speed Wf according to the predetermined command value. However, for example, if a value of first feed speed Wf1 and a value of maximum speed Wf2 are set to the same value, all wire feed speeds Wf after the timing that a short circuit occurs at maximum speed Wf2 may be controlled to a constant value. This will disturb the cycle of wire feed speed Wf. This disturbance of cycle leads to variations in the cyclic nature of generation and opening of short circuit or the number of short circuits. Welding results thus become unstable.

If a short circuit is not generated, the feed speed is preferably controlled to a constant value roughly between the average feed speed set for each set welding current and an intermediate speed of maximum speed Wf2 of amplitude (speed at a point ⅛ cycle after maximum speed Wf2). In other words, if the feed speed controlled at a constant value is between the average feed speed and the speed at a time point ⅛ cycle after maximum speed Wf2, the cycle of wire feed speed Wf will not be disturbed. If the feed speed controlled to a constant value is out of this range, a cycle of wire feed speed Wf will be disturbed.

If a short circuit occurs at time t4, deceleration of wire feed speed Wf is resumed from the control at constant value (first feed speed Wf1). The predetermined cyclic wire feed speed is resumed. On and after time t4, the feed speed decelerates, and soon feeding changes from forward feed to backward feed. At time t5, the short circuit is opened, and arc is regenerated.

With this operation, a droplet at the wire end will not grow by changing wire feeding from forward feed to backward feed, even if generation of a short circuit is delayed due to longer distance between the tip and base material at timing A. In addition, a short circuit can be generated earlier compared to the case of not setting a constant value to wire feed speed Wf. Disturbance of short-circuit cycle, in line with reduction of spatter generation and longer short circuit period, is suppressed. Stability of arc can thus be enhanced. The consumable electrode arc welding control method in this exemplary embodiment repeats the above cycle of short circuit period and arc period.

Next is described an arc welding device for the aforementioned control of consumable electrode arc welding with reference to FIG. 1. In FIG. 1, welding voltage detector 9 is connected between welding power output terminals 14a and 14b, and outputs a signal corresponding to detected voltage. Short circuit/arc detector 10 determines whether weld output voltage Vw is less or not less than a constant value based on the signal from welding voltage detector 9. Based on this determination result, the short circuit state, in which wire 16 is making contact and generating short circuit with base material 15 that is a workpiece, or the arc state, in which wire 16 is not making contact, is determined and a determination signal is output.

Next is described the wire feed control after short circuit/arc detector 10 makes determination. Wire feed speed controller 13 outputs to wire feeder 19 a signal for controlling the speed at predetermined cyclic wire feed speed Wf, so as to control wire feed speed Wf. This cyclic waveform may be sinusoidal, as shown in FIG. 2, or trapezoidal as long as cyclic form is achieved. Wire feed speed controller 13 includes memory 21 that stores a formula or table including set current, average feed speed of wire feed speed Wf, frequency of wire feed speed, and amplitude of wire feed speed Wf in a linked manner; and wire feed speed determinator 22 that determines the average feed speed of wire feed speed Wf, frequency of wire feed speed Wf, and amplitude of wire feed speed Wf with reference to memory 21 based on the set current set in welding condition setting unit 12. In this way, wire feed speed controller 13 controls wire feeding by outputting to wire feeder 19 a signal that repetitively controls the cycle of forward feed and backward feed of wire feed speed Wf upon receiving an output of short circuit/arc detector 10 and an output of wire feed speed determinator 22.

Next is described, the welding output control of welding current Aw and welding voltage Vw. Output controller 11 outputs a signal for controlling welding current or welding voltage with reference to an appropriate parameter for the short circuit period, in case of the short circuit period, based on a weld waveform parameter selected depending on the set welding current and set welding current set by an operator via welding condition setting unit 12. In case of arc period, output controller 11 outputs a signal for controlling welding current or welding voltage with reference to an appropriate parameter for the arc period. These output signals are input to switching element 4 to control the welding output.

Now, the operation is described below when the distance between the tip and base material becomes longer, which is external disturbance, in the arc period. If wire feed speed controller 13 does not receive a signal indicating generation of short circuit from short circuit/arc detector 10 before the wire feed speed is decelerated to predetermined first feed speed Wf1 in forward feed, as shown FIG. 2, during the deceleration period in forward wire feed, wire feed speed controller 13 suspends the predetermined cyclic deceleration control, and switches from the cyclic control to the constant-value control at first feed speed Wf1. Wire feed speed controller 13 outputs a control signal to wire feeder 19 to feed wire 16 at a constant speed. This constant wire feeding at first feed speed Wf1 continues until a short circuit is generated and wire feed speed controller 13 receives a short-circuit detection signal from short circuit/arc detector 10.

Since first feed speed Wf1 is a predetermined forward feed value, short circuit is soon generated. Wire feed speed controller 13 thus receives the short-circuit detection signal from short circuit/arc detector 10. Then, wire feed speed controller 13 switches from the constant-value control at first feed speed Wf1 to the predetermined cyclic control, and the cyclic control is resumed to restart deceleration based on a cyclic speed command. Output controller 11 appropriately controls welding current and welding voltage in the short circuit period until the short circuit is opened.

In this exemplary embodiment, a value for waiting generation of short circuit, i.e., timing to stop changing wire feed speed Wf cyclically and switching to the constant-value control at first feed speed Wf1, is set to timing when the wire feed speed becomes first feed speed Wf1. However, a predetermined angle (e.g., 110° if an angle of first feed speed Wf1 is 90°) may be set when one cycle of wire feed speed is angle of 360°. Wire feed speed Wf may be controlled to change from cyclic wire feed speed Wf to constant speed if short circuit is not generated before this angle. Alternatively, a value for waiting generation of short circuit, i.e., timing to stop changing wire feed speed Wf cyclically, may be a time point when a predetermined time passes from opening the short circuit or a time point when a predetermined time passes from a time point at which the wire feed speed reaches first feed speed Wf1.

As described above, in this exemplary embodiment, a droplet at the wire end does not grow by backward feed of wire 16 even if generation of a short circuit is delayed due to external disturbance such as extended distance between the tip and base material in the deceleration period at forward wire feed speed during arc generation. And, early generation of a short circuit can be encouraged during forward feed. Accordingly, the exemplary embodiment can better stabilize arc by reducing spatter generation, and suppressing variations in the short circuit cycle and the number of short circuits due to extended interval between short circuits.

Second Exemplary Embodiment

Parts that are same as the first exemplary embodiment are given the same reference marks to omit duplicate detailed description in this exemplary embodiment. Major difference from the first exemplary embodiment is the control of wire feed speed Wf when arc is not generated during backward wire feed in the short circuit period between generation of short circuit and generation of arc.

Figure 3:
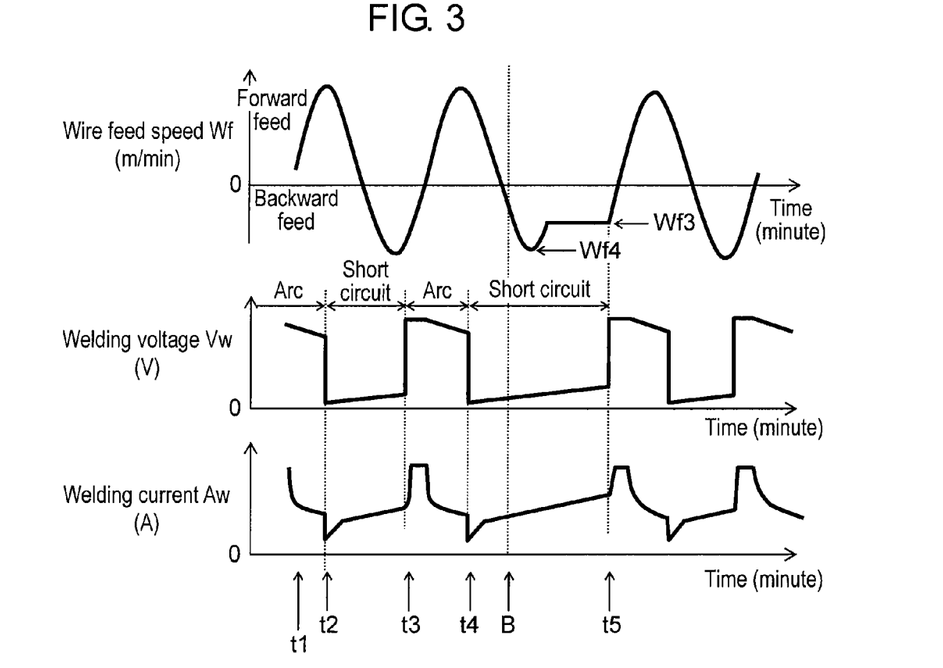
FIG. 3 illustrates waveforms of a wire feed speed, welding voltage, and welding current in accordance with the second exemplary embodiment of the present invention.

FIG. 1 used in the first exemplary embodiment shows a schematic diagram of a consumable electrode arc welding device also applicable to this exemplary embodiment. FIG. 3 shows waveforms of a wire feed speed, welding voltage, and welding current when welding takes place adopting a consumable electrode arc welding control method in this exemplary embodiment.

Time t1 in FIG. 3 is within the arc period where arc is generated. Outputs of welding voltage Vw and welding current Aw are controlled to form an appropriate droplet in order to smoothly transfer the droplet at a wire end in a coming short circuit period. Wire feed speed Wf is controlled cyclically according to a predetermined command value. The wire feed speed is accelerated at time t1.

In the short circuit period from time t2 to time t3, the wire is fed according to the predetermined command value, and outputs of welding current Aw and welding voltage Vw are appropriately controlled in the short circuit period. The output control is the same as that described in the first exemplary embodiment. Then, at time t3, the short circuit is opened, and arc is regenerated. In this way, welding takes place by repetition of generation of short circuit and regeneration of arc.

At time t4, a short circuit occurs again. Wire 16 is fed cyclically according to the predetermined command value, and outputs of welding current Aw and welding voltage Vw are appropriately controlled in the short circuit period. However, let's say external disturbance such as a shorter distance between tip 20 and base material 15 occurs at timing B in this short circuit period, typically due to positional deviation in placement of base material 15 that is a workpiece, and base material 15 becomes closer to an end of tip 20. In this case, the short circuit continues without being opened.

In this exemplary embodiment, acceleration is stopped and wire 16 is fed at a constant value of second feed speed Wf3, so as to suppress continuation of short circuit without being opened, if the short circuit is not opened at a time point when the wire feed speed reaches second feed speed Wf3 during acceleration from minimum speed Wf4 in backward feed. Since second feed speed Wf3 is a value for backward feed, the wire can be certainly drawn up to open the short circuit. Accordingly, this exemplary embodiment can suppress splattering of wire portion, increased spatter, or adhesion of the wire end and base material that may occur during short-circuiting if the process moves onto forward feed without opening the short circuit, as described in a disadvantage of the prior art.

Timing for opening a short circuit can be made earlier by setting a lower value (higher in a negative absolute value) for second feed speed Wf3. Accordingly, lower second feed speed Wf3 is better for earlier timing of opening the short circuit. However, second feed speed Wf3 is preferably not as low as minimum speed (Wf4). This is because if the distance between the tip and base material is constant when no disturbance occurs, the short circuit is opened at timing when a value of wire feed speed Wf is around minimum speed Wf4 (roughly within ±⅛ cycle). Therefore, the short circuit may be often opened after acceleration starts from minimum speed Wf4.

If the distance between the tip and base material is constant, there is no influence on generation of next short circuit or a short-circuit cycle even if the timing of short circuit deviates around minimum speed Wf4 (for about ±⅛ cycle). Therefore, there will be no problem if the wire is fed cyclically at wire feed speed Wf according to the predetermined command value. However, for example, if a value of second feed speed Wf3 is set to the same value as minimum speed Wf4, the wire feed speed will be controlled to a constant value to open the short circuit in all cases when the short circuit is opened at timings after minimum speed Wf4. This will disturb the cycle of wire feed speed. This disturbance of cycle leads to variations in the cyclic nature of generation and opening of short circuit, or the number of short circuits. Welding results thus become unstable. Accordingly, a threshold wire feed speed for controlling the feed speed to the constant value when the short circuit is not opened is preferably set to the wire feed speed at the time point roughly about ⅛ cycle after minimum feed speed Wf4.

If the short circuit is opened at time t5, wire feed speed Wf is switched from the constant-value control at second feed speed Wf3 to the cyclic control. The acceleration control is then resumed, and the predetermined cyclic wire feed speed is resumed. Since the wire feed speed is accelerated, wire feeding transfers from backward feed to forward feed as time passes, and a short circuit is generated.

The above control suppresses adhesion of the wire end and base material or splatter and causes early opening of the short circuit even if opening of the short circuit is delayed due to shorter distance between the tip and base material at timing B. Accordingly, stability of arc can be enhanced by reducing spatter generation and also reducing disturbance of the short-circuit cycle.

The consumable electrode arc welding control method in this exemplary embodiment repeats the above cycle of short circuit period and arc period.

Next is described, with reference to FIG. 1, an arc welding device for the aforementioned control of consumable electrode arc welding when a distance between the tip and base material becomes shorter during the short circuit period. As shown in FIG. 3, wire feed speed controller 13 switches the wire feed speed from predetermined cyclic acceleration control to constant-value control at second feed speed Wf3, and outputs this control to wire feeder 19 when a short-circuit opening signal is not input from short circuit/arc detector 10 before acceleration of the wire feed speed reaches second feed speed Wf3 in backward feed. The constant feed control at second feed speed Wf3 is then applied until the short circuit is opened.

Since second feed speed Wf3 is a predetermined backward feed value, the short circuit is soon opened, and wire feed speed controller 13 receives an opening detection signal from short circuit/arc detector 10. Wire feed speed controller 13 then resumes the acceleration control of wire feed speed Wf4 according to the predetermined cyclic speed command from the constant-value control at second feed speed Wf3. In the arc period, output controller 11 controls welding current and welding voltage appropriate for the arc period until next generation of short circuit.

In this exemplary embodiment, a value for waiting opening of short circuit, i.e., timing to stop changing cyclic wire feed speed Wf, is set at second feed speed Wf3. However, a predetermined angle (e.g. 300° if an angle of minimum speed Wf4 is 270°) may be set when one cycle of wire feed speed is an angle of 360°. Alternatively, a value for waiting opening of short circuit, i.e., timing to stop changing the wire feed speed cyclically, may be a time point when a predetermined time passes from occurrence of short circuit, or a time point when a predetermined time passes from the time point at which the wire feed speed reaches minimum speed Wf4.

As described above, the consumable electrode arc welding device and the consumable electrode arc welding control method in this exemplary embodiment can prevent adhesion of the wire end and base material, suppresses splatter, and encourages early opening of short circuit even if opening of short circuit is delayed due to shorter distance between the tip and base material in the acceleration period at the backward wire feed speed. This reduces spatter generation and also reduces variations in the short circuit cycle and number of short circuits. Accordingly, stability of arc can be enhanced.

Third Exemplary Embodiment

Parts that are same as the first and second exemplary embodiments are given the same reference marks to omit duplicate detailed description. Major difference from the first and second exemplary embodiments is the control of wire feed speed to achieve a predetermined average wire feed speed for each set welding current by calculating an average wire feed speed for every cycle of cyclic wire feed speed.

Figure 4:
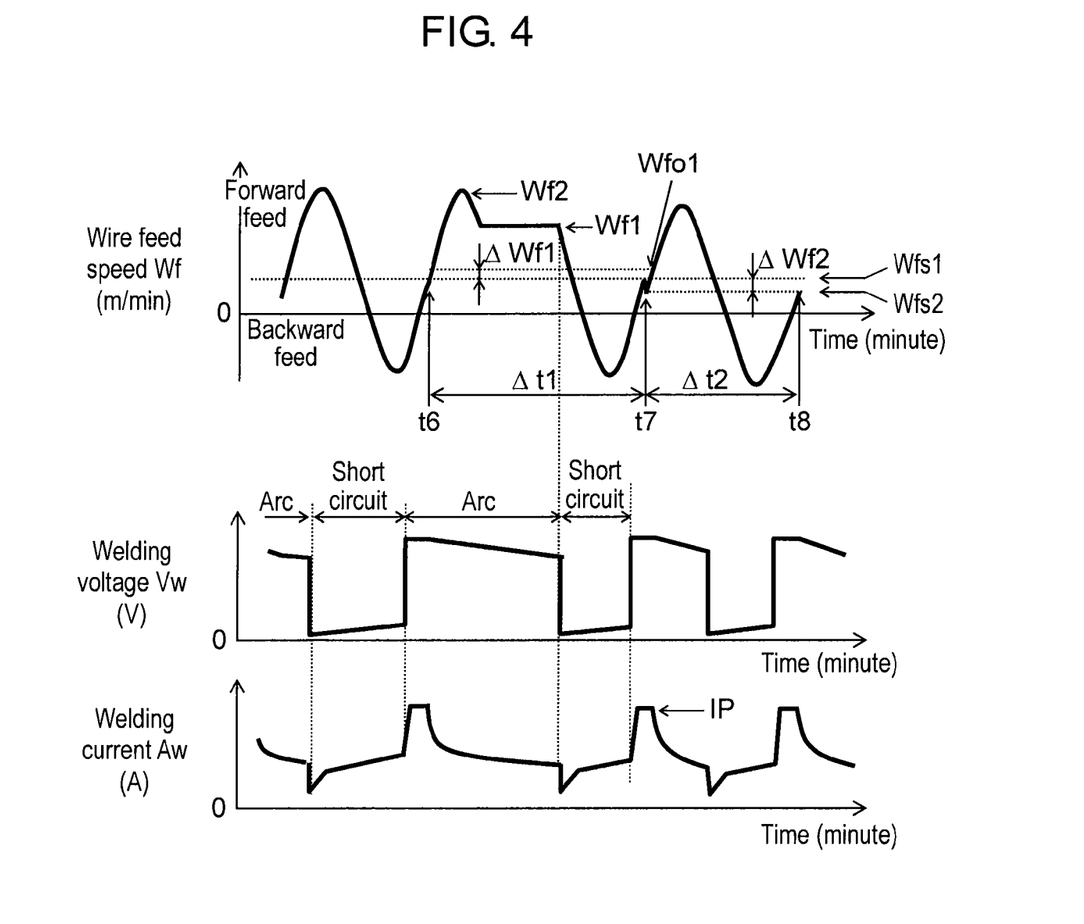
FIG. 4 illustrates a waveform of a wire feed speed, welding voltage, and welding current in accordance with the third exemplary embodiment of the present invention.

FIG. 1 used in the first and second exemplary embodiments show a structure also applicable to a consumable electrode arc welding device in this exemplary embodiment. FIG. 4 shows waveforms of a wire feed speed and average feed speed when welding takes place adopting the consumable electrode arc welding control method in this exemplary embodiment.

A dotted line of Wfs1 in FIG. 4 shows a reference average feed speed that is set for each set welding current. As described later, this is set based on set current. Reference average feed speed Wfs1 is preset to that equivalent to an average value of cyclically changing wire feed speed.

To respond to unexpected external disturbance, such as change of distance between the tip and base material, in the middle of welding, as described in the first and second exemplary embodiments, a cyclic change of wire feed speed is stopped, and wire feeding is controlled at a constant speed different from the cyclic wire feed speed. This changes the average value of wire feed speed, and the average feed speed becomes different from aforementioned reference average feed speed set for each set welding current.

For example, external disturbance has not occurred until a time point of time t6 in FIG. 4. The wire is thus fed cyclically at the predetermined cyclic wire feed speed. The average wire feed speed until time t6 is equivalent to reference average feed speed Wfs1. However, external disturbance shown in the first exemplary embodiment occurs in the next cycle (from time t6 to t7). If the feed control described in the first exemplary embodiment is executed, time for controlling the wire feed speed at a constant value of first feed speed Wf4 until a short circuit occurs increases, and an average wire feed speed for one cycle from time t6 to t7 becomes Wfo1, which is $\Delta Wf1$ higher than reference average feed speed Wfs1. An increase of the average feed speed increases wire feed amount, and this increased feeding is $\Delta Wf1 \times \Delta t1$ against preset wire feed amount. This increased feed amount increases weld amount, and thus bead width broadens and bead height becomes taller. Amount of weld penetration also increases. If external disturbance further continues and the number of increases continue, the wire weld amount further increases, and the bead width, bead height, or penetration depth increases. This may cause burn-through, giving detrimental effect on welding results.

To suppress this detrimental effect, an average of the wire feed speed is controlled and set to predetermined reference average feed speed Wfs1 from time t7 so that the aforementioned increase in the wire feed speed in the next cycle ($\Delta t2$) can be balanced. More specifically, the wire feed speed in the next one cycle ($\Delta t2$) is set to the feed speed shifted in parallel to the lower-speed direction so that the average wire feed speed becomes Wfs2 obtained by subtracting $\Delta Wf2 (= (\Delta Wf1 \times \Delta t1)/\Delta t2)$, which is the increase divided by the time of next one cycle, from predetermined reference average feed speed Wfs1. The wire feed speed is controlled by shifting in parallel the average feed speed, i.e., the center position of amplitude, to the lower-speed direction without changing the amplitude and frequency.

With this control, even if the average wire feed speed increases to the predetermined reference average wire feed speed due to temporal change of wire feed speed against external disturbance, this increase can be balanced in the next one cycle, and the speed returns to the predetermined reference average wire feed speed. Accordingly, the welding results are not affected, and satisfactory weld bead can be achieved.

Contrary, if the average wire feed speed decreases due to a shorter distance between the tip and base material, as shown in the second exemplary embodiment, the wire feed speed in the next one cycle is increased to balance the decrease.

If the increase or decrease is too large to balance only by the next one cycle, the increase or decrease may be balanced using multiple cycles, such as two cycles or three cycles.

As described above, this exemplary embodiment controls the average wire feed speed of wire feed speed to the predetermined reference average wire feed speed in the next cycle or the next multiple cycles even if the average feed speed of the wire feed speed is changed to reduce any increase in spatter generation or unstable arc due to unexpected external disturbance occurred in the middle of welding, as described in the first and second exemplary embodiments. Accordingly, any effect on the bead width, bead height, or penetration depth can be suppressed.

INDUSTRIAL APPLICABILITY

The arc welding control method and device of the present invention can reduce spatter and improve stability of arc by controlling the wire feed speed even if external disturbance such as change of distance between the tip and base material occurs during welding. Accordingly, the present invention is industrially effective to methods and devices for arc welding that successively feeds the welding wire that is a consumable electrode.

REFERENCE MARKS IN THE DRAWINGS

1 Input power supply
2 Main transformer
3 Primary rectifying element
4 Switching element 5 Reactor
6 Secondary rectifying element
8 Welding current detector
9 Welding voltage detector
10 Short circuit/arc detector
11 Output controller
12 Welding condition setting unit
13 Wire feed speed controller
14 Welding power supply
14a, 14b Welding power output terminal
15 Base material
16 Wire
17 Arc
18 Torch
19 Wire feeder
20 Tip
21 Memory
22 Wire feed speed determinator
25 Wire storage

The invention claimed is:

1. A consumable electrode arc welding method in which welding takes place by feeding a welding wire at a wire feed speed with a cyclic change in a predetermined cycle and amplitude, the wire feed speed including forward feed for feeding the welding wire toward a workpiece to be welded and backward feed for feeding the welding wire in a direction opposite to the forward feed, the method comprising:
stopping the cyclic change and applying a constant control at a first feed speed of the wire feed speed if no short circuit occurs during deceleration of the wire feed speed in the forward feed of the welding wire before one of the wire feed speed reaching a predetermined wire feed speed, a predetermined time passing from arc generation, and a feed cycle of the welding wire reaching a predetermined angle when the predetermined cycle of feeding the welding wire is expressed by an angle; and
welding by starting deceleration from the first feed speed and resuming the cyclic change if the short circuit occurs during the forward feed at the first feed speed.

2. The consumable electrode arc welding method of claim 1, wherein the predetermined wire feed speed is the first feed speed.

3. The consumable electrode arc welding method of claim 2, wherein the cyclic change of the wire feed speed is one of a sinusoidal and trapezoidal change.

4. The consumable electrode arc welding method of claim 2, wherein the welding wire feed speed is an average wire feed speed corresponding to a set current.

5. The consumable electrode arc welding method of claim 4 in which welding takes place at the wire feed speed with a cyclic change in the predetermined cycle and amplitude, wherein
an average cyclic wire feed speed of a cycle is calculated for each cycle;
if the average cyclic wire feed speed of one cycle is lower than the average wire feed speed, welding takes place at the wire feed speed shifted in parallel to a higher speed than the average wire feed speed so that the average cyclic wire feed speed of a cycle on and after a next cycle of the one cycle becomes higher than the average wire feed speed, the wire feed speed being the average cyclic wire feed speed on and after the next cycle; and
if the average cyclic wire feed speed of the one cycle is higher than the average wire feed speed, welding takes place at the wire feed speed shifted in parallel to a lower speed than the average wire feed speed so that the average cyclic wire feed speed of the cycle on and after the next cycle of the one cycle becomes lower than the average wire feed speed, the wire feed speed being the average cyclic wire feed speed on and after the next cycle.

6. The consumable electrode arc welding method of claim 5, wherein the cycle on and after the next cycle is a next one cycle.

7. The consumable electrode arc welding method of claim 5, wherein the cycle on and after the next cycle is a plurality of cycles on and after the next cycle.

8. The consumable electrode arc welding method of claim 1, wherein the cyclic change of the wire feed speed is one of a sinusoidal and trapezoidal change.

9. The consumable electrode arc welding method of claim 1, wherein the welding wire feed speed is an average wire feed speed corresponding to a set current.

10. The consumable electrode arc welding method of claim 9 in which welding takes place at the wire feed speed with a cyclic change in the predetermined cycle and amplitude, wherein
an average cyclic wire feed speed of a cycle is calculated for each cycle;
if the average cyclic wire feed speed of one cycle is lower than the average wire feed speed, welding takes place at the wire feed speed shifted in parallel to a higher speed than the average wire feed speed so that the average cyclic wire feed speed of a cycle on and after a next cycle of the one cycle becomes higher than the average wire feed speed, the wire feed speed being the average cyclic wire feed speed of the cycle on and after the next cycle; and
if the average cyclic wire feed speed of the one cycle is higher than the average wire feed speed, welding takes place at the wire feed speed shifted in parallel to a lower speed than the average wire feed speed so that the average cyclic wire feed speed of the cycle on and after the next cycle of the one cycle becomes lower than the average wire feed speed, the wire feed speed being the average cyclic wire feed speed on and after the next cycle.

11. The consumable electrode arc welding method of claim 10, wherein the cycle on and after the next cycle is a next one cycle.

12. The consumable electrode arc welding method of claim 10, wherein the cycle on and after the next cycle is a plurality of cycles on and after the next cycle.

13. A consumable electrode arc welding method in which welding takes place by feeding a welding wire at a wire feed speed with a cyclic change in a predetermined cycle and amplitude, the wire feed speed including forward feed for feeding the welding wire toward a workpiece to be welded and backward feed for feeding the welding wire in a direction opposite to the forward feed, the method comprising:
stopping the cyclic change and applying a constant control at a second feed speed of the wire feed speed if a short circuit is not opened during acceleration of the wire feed speed in the backward feed of the welding wire before one of the wire feed speed reaching a predetermined wire feed speed, a predetermined time passing from short circuit generation, and a feed cycle of the welding wire reaching a predetermined angle when the predetermined cycle of feeding the welding wire is expressed by an angle; and
welding by starting acceleration from the second feed speed and resuming the cyclic change if the short circuit is opened during the backward feed at the second feed speed.

14. The consumable electrode arc welding method of claim 13, wherein the predetermined wire feed speed is the second feed speed.

15. The consumable electrode arc welding method of claim 13, wherein the cyclic change of the wire feed speed is one of a sinusoidal and trapezoidal change.

16. The consumable electrode arc welding method of claim 13, wherein the welding wire feed speed is an average wire feed speed corresponding to a set current.

17. The consumable electrode arc welding method of claim 16 in which welding takes place at the wire feed speed with a cyclic change in the predetermined cycle and amplitude,
wherein
an average cyclic wire feed speed of a cycle is calculated for each cycle;
if the average cyclic wire feed speed of one cycle is lower than the average wire feed speed, welding takes place at the wire feed speed shifted in parallel to a higher speed than the average wire feed speed so that the average cyclic wire feed speed of a cycle on and after a next cycle of the one cycle becomes higher than the average wire feed speed, the wire feed speed being the average cyclic wire feed speed on and after the next cycle; and
if the average cyclic wire feed speed of the one cycle is higher than the average wire feed speed, welding takes place at the wire feed speed shifted in parallel to a lower speed than the average wire feed speed so that the average cyclic wire feed speed of the cycle on and after the next cycle of the one cycle becomes lower than the average wire feed speed, the wire feed speed being the average cyclic wire feed speed on and after the next cycle.

18. The consumable electrode arc welding method of claim 17, wherein the cycle on and after the next cycle is a next one cycle.

19. The consumable electrode arc welding method of claim 17, wherein the cycle on and after the next cycle is a plurality of cycles on and after the next cycle.

20. A consumable electrode arc welding device in which welding takes place by repeating an arc state and a short circuit state between a welding wire and a workpiece to be welded, the device comprising:
a switching element for controlling a welding output;
a welding voltage detector for detecting a welding voltage;
a welding condition setting unit for setting a set current;
a short circuit/arc detector for detecting one of the short circuit state and the arc state based on an output of the welding voltage detector;
a memory for storing the set current, an average feed speed of wire feed speed, a frequency of the wire feed speed, and an amplitude of the wire feed speed in a linked manner;
a wire feed speed determinator for determining the average feed speed of wire feed speed, the frequency of wire feed speed, and the amplitude of wire feed speed from the memory based on the set current set by the welding condition setting unit; and
a wire feed speed controller for receiving an output of the short circuit/arc detector and an output of the wire feed speed determinator, and controlling the wire feed speed in cyclic change of forward feed and backward feed,
wherein
the wire feed speed controller stops the cyclic change and starts a constant control of the wire feed speed at a first feed speed if no short circuit occurs during deceleration of the wire feed speed in the forward feed of the welding wire before one of the wire feed speed reaching a predetermined feed speed, a predetermined time passing from arc generation, and a feed cycle of the welding wire reaching a predetermined angle when one feed cycle of the welding wire is expressed by an angle; and if the short circuit occurs during the forward feed at the first feed speed, deceleration from the first feed speed starts and the cyclic change is resumed for welding.

21. The consumable electrode arc welding device of claim 20, wherein the wire feed speed controller calculates an average cyclic wire feed speed of a cycle for each cycle; if the average cyclic wire feed speed of one cycle is lower than an average wire feed speed, welding takes place at the wire feed speed shifted in parallel to a higher speed than the average wire feed speed so that the average cyclic wire feed speed of a cycle on and after a next cycle of the one cycle becomes higher than the average wire feed speed, the wire feed speed being an average cyclic wire feed speed on and after the next cycle; and if the average cyclic wire feed speed of the one cycle is higher than the average wire feed speed, welding takes place at the wire feed speed shifted in parallel to a lower speed than the average wire feed so that the average cyclic wire feed speed of the cycle on and after the next cycle of the one cycle becomes lower than the average wire feed speed, the wire feed speed being the average cyclic wire feed speed on and after the next cycle.

22. A consumable electrode arc welding device in which welding takes place by repeating an arc state and a short circuit state between a welding wire and a workpiece to be welded, the device comprising:
a switching element for controlling a welding output;
a welding voltage detector for detecting a welding voltage;
a welding condition setting unit for setting a set current;
a short circuit/arc detector for detecting one of the short circuit state and the arc state based on an output of the welding voltage detector;
a memory for storing the set current, an average feed speed of wire feed speed, frequency of the wire feed speed, and an amplitude of the wire feed speed in a linked manner;
a wire feed speed determinator for determining the average feed speed of wire feed speed, the frequency of wire feed speed, and the amplitude of wire feed speed from the memory based on the set current set by the welding condition setting unit; and
a wire feed speed controller for receiving an output of the short circuit/arc detector and an output of the wire feed speed determinator, and controlling the wire feed speed in cyclic change of forward feed and backward feed,
wherein
the wire feed speed controller stops the cyclic change and starts a constant control of the wire feed speed at a second feed speed if a short circuit is not opened during acceleration of the wire feed speed in the backward feed of the welding wire before one of the wire feed speed reaching a predetermined feed speed, a predetermined time passing from short circuit generation, and a feed cycle of the welding wire reaching a predetermined angle when one feed cycle of the welding wire is expressed by angle; and if the short circuit is opened during the backward feed at the second feed speed, acceleration from the second feed speed starts and the cyclic change is resumed for welding.

23. The consumable electrode arc welding device of claim 22, wherein the wire feed speed controller calculates an average cyclic wire feed speed of a cycle for each cycle; if the average cyclic wire feed speed of one cycle is lower than an average wire feed speed, welding takes place at the wire feed speed shifted in parallel to a higher speed than the average wire feed speed so that the average cyclic wire feed speed of a cycle on and after a next cycle of the one cycle becomes higher than the average wire feed speed, the wire feed speed being an average cyclic wire feed speed on and after the next cycle; and if the average cyclic wire feed speed of the one cycle is higher than the average wire feed speed, welding takes place at the wire feed speed shifted in parallel to a lower speed than the average wire feed so that the average cyclic wire feed speed of the cycle on and after the next cycle of the one cycle becomes lower than the average wire feed speed, the wire feed speed being the average cyclic wire feed speed on and after the next cycle.

* * * * *